Figure 1:
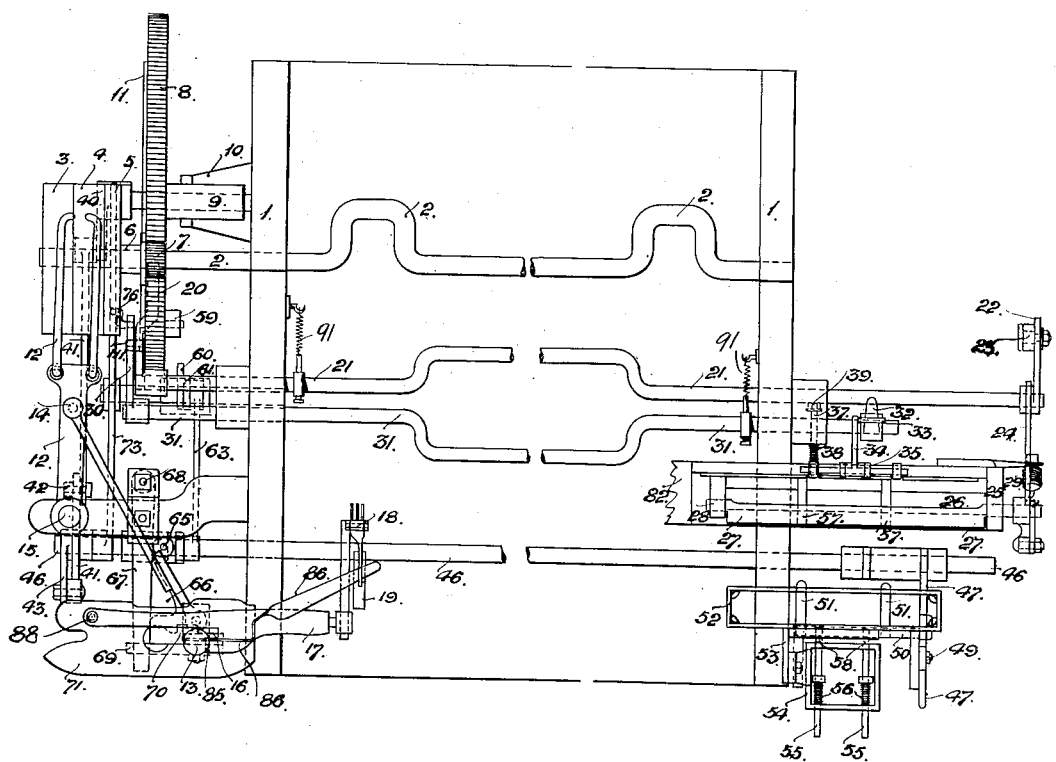

No. 810,406. PATENTED JAN. 23, 1906.
J. M. GREY.
WEFT REPLENISHING MECHANISM FOR LOOMS.
APPLICATION FILED SEPT. 4, 1903.

6 SHEETS—SHEET 1.

Fig: 1.

WITNESSES
H. M. Kuehne
John A. Percival

INVENTOR
James Mitchell Grey
BY Richards & Co.
ATTORNEYS

No. 810,406. PATENTED JAN. 23, 1906.
J. M. GREY.
WEFT REPLENISHING MECHANISM FOR LOOMS.
APPLICATION FILED SEPT. 4, 1903.

6 SHEETS—SHEET 2.

WITNESSES
INVENTOR

No. 810,406. PATENTED JAN. 23, 1906.
J. M. GREY.
WEFT REPLENISHING MECHANISM FOR LOOMS.
APPLICATION FILED SEPT. 4, 1903.

6 SHEETS—SHEET 3.

Fig: 3.

WITNESSES
H. M. Kuehne
John A. Percival

INVENTOR
James Mitchell Grey
BY Richards & Co.

ATTORNEYS

No. 810,406. PATENTED JAN. 23, 1906.
J. M. GREY.
WEFT REPLENISHING MECHANISM FOR LOOMS.
APPLICATION FILED SEPT. 4, 1903.

6 SHEETS—SHEET 4.

WITNESSES
John A. Percival
H. M. Kuehne

INVENTOR
James Mitchell Grey
BY Richards & Co
ATTORNEYS

No. 810,406. PATENTED JAN. 23, 1906.
J. M. GREY.
WEFT REPLENISHING MECHANISM FOR LOOMS.
APPLICATION FILED SEPT. 4, 1903.
6 SHEETS—SHEET 5.
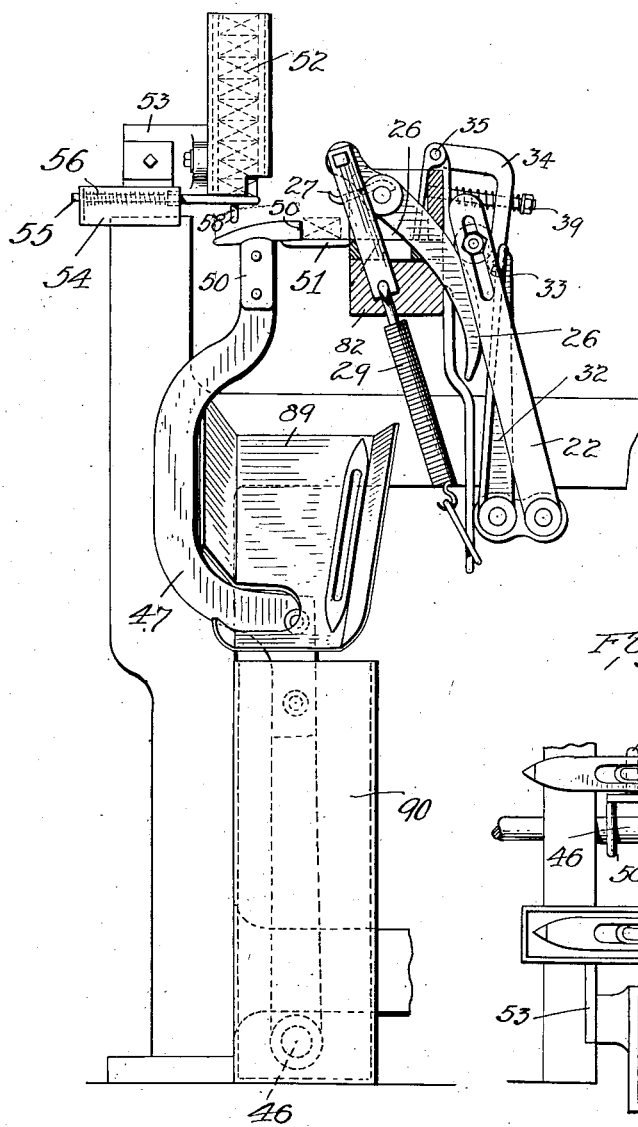
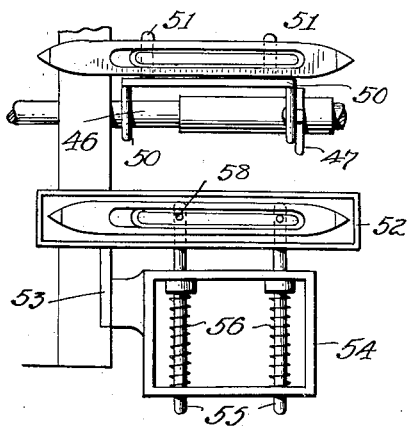

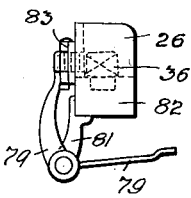
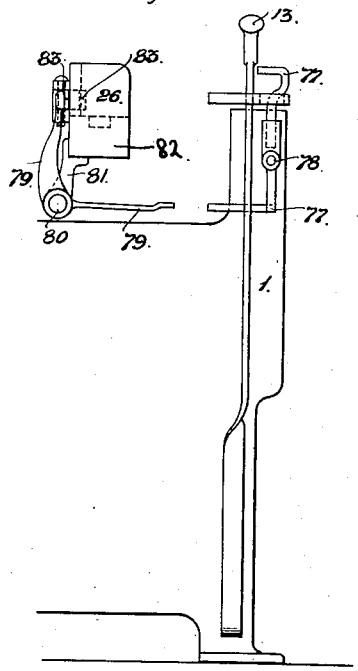
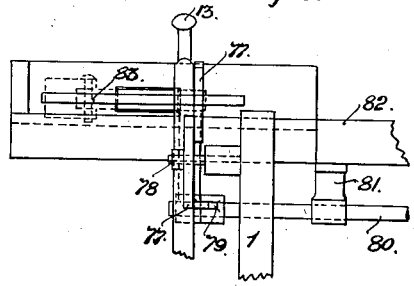
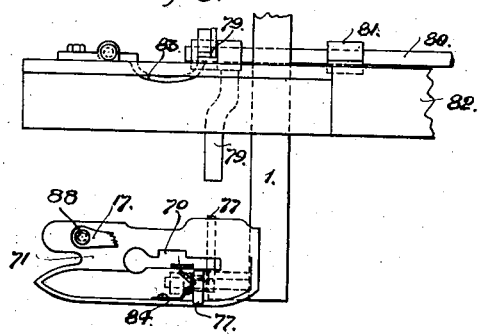
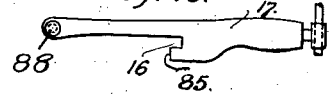

UNITED STATES PATENT OFFICE.

JAMES MITCHELL GREY, OF BURNLEY, ENGLAND.

WEFT-REPLENISHING MECHANISM FOR LOOMS.

No. 810,406.   Specification of Letters Patent.   Patented Jan. 23, 1906.

Application filed September 4, 1903. Serial No. 171,937.

*To all whom it may concern:*

Be it known that I, JAMES MITCHELL GREY, cotton manufacturer, residing at 1 Colne road, Burnley, in the county of Lancaster, England, have invented certain new and useful Improvements in Weft-Replenishing Mechanism for Looms, of which the following is a specification.

My invention relates to improvements in those automatic shuttle-changing motions of looms for weaving in which the moving parts of the loom are stopped altogether on the breakage or failure of weft and while the change of shuttles is being effected; and the chief object of my improvements is to simplify, reduce the cost of, and render more efficient and positive the mechanism for stopping the loom on the back centers, ejecting the spent shuttle, inserting a fresh shuttle through the front of the shuttle-box, and then restarting the loom.

A second object of my improvements is to prevent the automatic shuttle-changing motion when applied to loose reed-looms from coming into action if a shuttle is trapped in the shed, and thus prevent two shuttles from being present simultaneously in the shed, and, further, should the magazine of spare shuttles in a loose reed-loom become exhausted to stop the loom and so prevent an ineffective weaving and shuttle-changing action.

A third object of my improvements is to enable the automatic shuttle-changing motion in both fast and loose reed-looms to be thrown out of action and remain inoperative while the loom continues weaving as an ordinary loom without an automatic shuttle-changing motion.

A fourth object of my improvements is to prevent the automatic shuttle-changing motion from coming into action when the weft is unbroken, but the loom is stopped by the weaver to take up ends or for any other purpose.

I accomplish these objects by the mechanism illustrated in the accompanying sheets of drawings, in which—

Figure 2:
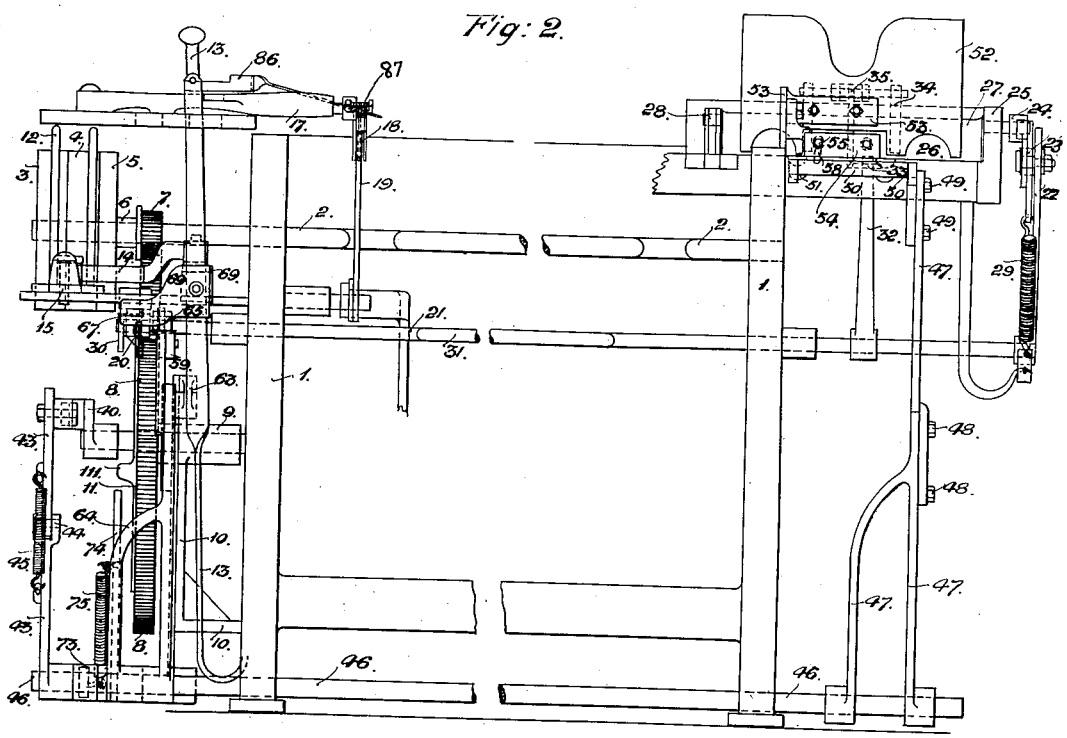
Figure 3:
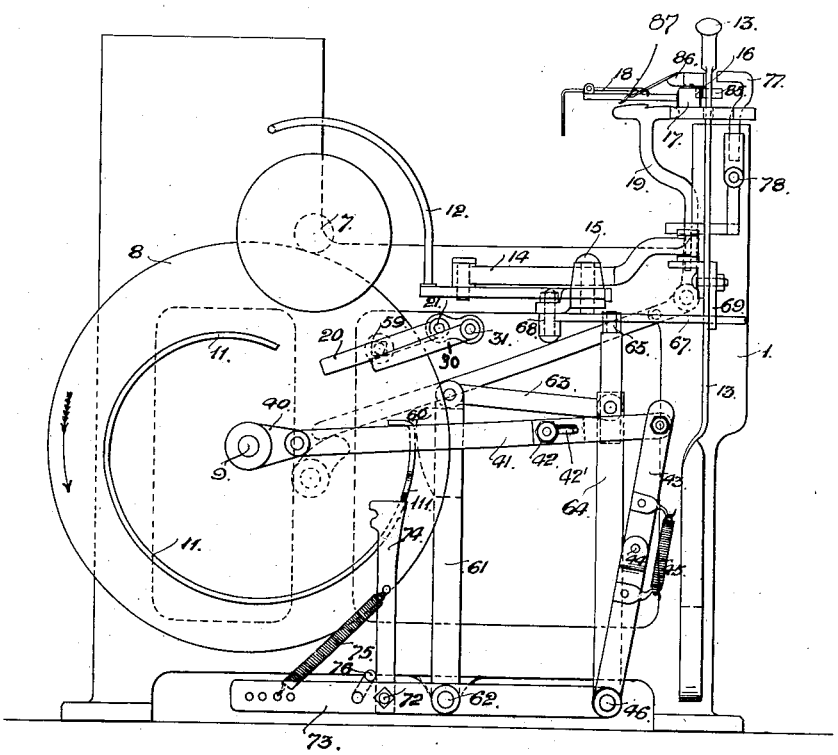
Figure 4:
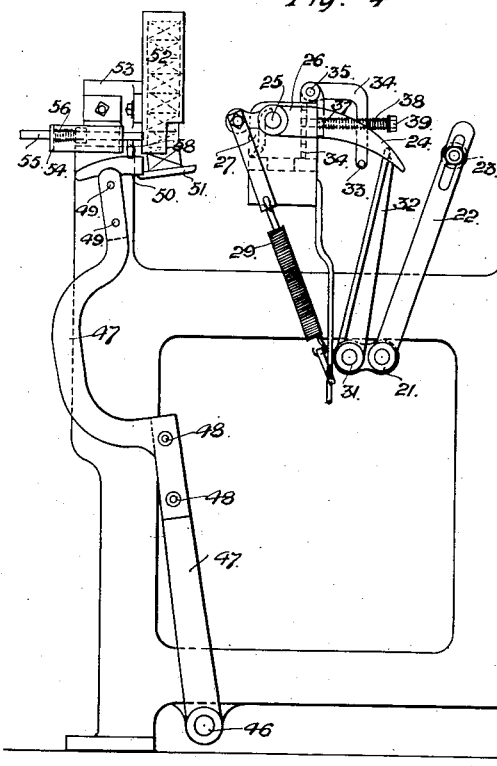
Figure 5:
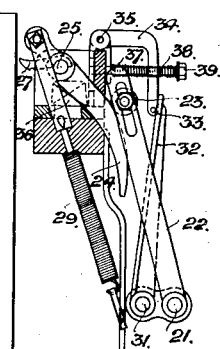

Figure 1 is a plan, Fig. 2 is a front elevation, Fig. 3 is an elevation of one end, and Fig. 4 is an elevation of the other end, of a loom to which my improvements in automatic shuttle-changing mechanism are applied. Fig. 4ª is a view similar to Fig. 4, but showing some of the parts in different positions and also showing the receiving-box and guide thereto, some of the parts being shown in section. Fig. 4ᵇ is a plan of the carrier-shuttle hopper and sliding supporting-rods. Fig. 5 is a view of some of the parts shown in Fig. 4, but with the front of the shuttle-box open and the shuttle on the point of being ejected. Fig. 6 is an elevation of the mechanism for preventing the automatic shuttle - changing motion from coming into action when not required. Fig. 7 is a similar view of a portion of Fig. 6, but showing the parts in different positions. Fig. 8 is a front view of Fig. 6. Fig. 9 is a plan view of the same. Fig. 10 is a detail view of the weft-fork lever.

Similar reference-numerals indicate like parts throughout the several views.

In the views, 1 denotes the frame of the loom, and 2 the crank-shaft, near one end of which I mount three pulleys 3, 4, and 5, respectively. The outside pulley 3 is fast on the crank-shaft and is driven by a belt (not shown) to drive the loom while weaving. The middle pulley 4 is loose on the crank-shaft, and the innermost pulley 5 is fast on a sleeve 6, which is mounted loose on the crank-shaft. Also fast with the sleeve 6 is a pinion 7, which gears into a large spur-wheel 8, carried on a short shaft 9, supported in a bracket 10, secured to the framing.

The large spur-wheel 8 has formed or fixed on its outside face a hollow cam 11, shaped to give the required movements, while the working parts of the loom are stopped to the mechanism for opening the shuttle-box at the front and ejecting the spent shuttle therefrom, for giving a dwell or pause during the changing of the shuttles and for closing the shuttle-box after the fresh shuttle has been inserted.

I make the connection between the strap-fork lever 12 and the knocking-off or spring handle 13 by means of a rod 14 at a point beyond the fulcrum 15 of the strap-fork lever and near the strap-fork, thus making the strap-fork a lever of the third order.

I make an open longitudinal slot 16 in the usual weft-fork lever 17, (shown detached in Fig. 10,) so that when the weft-fork lever 17, which is fulcrumed at 88, (see Fig. 1,) is drawn back by the engagement of the weft-fork 18 with the weft-hammer 19 the spring-handle 13, which during the ordinary working of the loom is latched in the notch 70 in the notch-plate 71 and presses against the weft-fork lever 17, is dislodged from the notch 70 by the movement of the weft-fork lever 17 and slides into the notch 16, moving the strap-fork 12, and thus transferring the driving-belt from the fast pulley 3 to the innermost pulley 5, and so driving the pinion 7, spur-wheel 8, and the hollow cam 11. As the cam 11 revolves it raises an arm 20, fixed on a cross-shaft 21, and so rocks in one direction an arm 22, near the end of which is mounted a bowl 23. With the rocking movement of the cross-shaft 21 this bowl 23 rides upon a lever 24, fixed on a pivot 25 outside the end of the shuttle-box 26 and projecting beyond the back of the shuttle-box. The front plate 27 of the shuttle-box is mounted to swing with the pivot 25, upon which the lever 24 is fixed, and a similar pivot 28 at the other end of the shuttle-box, so that when the lever 24 is depressed by the bowl 23 the front 27 of the shuttle-box is opened against the resistance of a spring 29, which tends to keep it normally closed and the lever 24 raised. After the front plate 27 has been raised the continued revolution of the hollow cam 11 brings a projection 111 thereon under and raises an arm 30 on a second cross-shaft 31, extending also to the opposite side of the loom, where an arm 32, as the shaft 31 rocks in one direction, strikes a projection 33 on a bent forked lever 34, pivoted at 35 on the top of the shuttle-box back, the forks of the bent lever 34 being inside the shuttle-box 26 and the other limb being outside the box-back.

When struck by the arm 32, the bent lever 34 ejects the spent shuttle 36 through the open front of the shuttle-box, the front plate 27 being raised at the time and the parts being in the relative positions shown in Fig. 5, the slay or lathe 82 being in its extreme backward position, with the crank of the loom on the crank-shaft 2 on its back dead-center, there being at this time the maximum of distance between the magazine of reserve shuttles 52 and the shuttle-box 26. The spent shuttle 36 when ejected from the box 26 falls onto a slide 89, fixed to the loom-framing 1 and held constantly under the shuttle-box 26 and shaped in such manner that the ejected shuttle 36 falling upon it slides into a box 90, placed at the end of the slide, and remains there until such time as the weaver removes it. A stud 37, passing through the box-back, is fixed on one of the forks of the bent lever 34, and on this stud is a coiled spring 38, confined between the box-back and a nut 39 on the screwed end of the stud, and this spring returns the bent lever 34 to its normal position, as shown in Fig. 4, when relieved. In like manner the rock-shafts 21 and 31 are returned to their original positions, as shown also in Fig. 4, by coiled springs 91.

The mechanism for inserting a fresh shuttle into the box 26 after the ejection of the spent shuttle 36, as described, consists of a carrier or pusher 50, actuated by the following parts: On the shaft 9 of the large spur-wheel 8 is fixed a crank 40, connected to a lever 43 by a rod 41, made in two parts secured together by a slot 42' and bolt 42 in order to be adjustable as to length. The lever 43 is made in two parts, pivoted together at 44 and held normally in the same straight line by a coiled spring 45, this construction enabling the two parts of the lever 43 to yield on their connecting-pivot 44 in the event of any obstruction being encountered by the carrier or pusher 50. The lever 43 is fixed to a rock-shaft 46, extending to the opposite side of the loom, where another lever 47 is fixed, which for convenience of construction may be made in, say, two parts, bolted together at 48, as shown. To the upper end of the lever 47 is bolted at 49 the shuttle-carrier or pusher 50, having two projections or fingers 51, by which a fresh shuttle is carried from the bottom of the magazine or hopper 52, containing the reserve of filled shuttles, and pushed into and deposited in the shuttle-box 26 through the opening formed by the raised front plate 27. The magazine 52 is carried by a bracket 53, bolted to the loom-framing 1, and this bracket also carries a bar or frame 54, through the opposite sides of which are passed two sliding rods 55, which are pressed forward by springs 56 to follow up the shuttle-carrier 50 and support the shuttles in the magazine when the carrier 50 moves forward from the magazine 52 with the bottom shuttle on the fingers 51, which had previously supported and prevented the filled shuttles from falling out through the open bottom of the magazine. When the fingers 51 move forward with the shuttle, they enter grooves or depressions 57, formed to receive them in the bottom of the shuttle-box 26, which is rather higher than the upper surface of the fingers 51, so that after insertion the shuttle is supported by the box-bottom and the fingers 51 are free to be withdrawn without it. The withdrawal of the fingers 51 takes place when the continued revolution of the crank 40 rocks the shaft 46 in the reverse direction and draws back the shuttle-carrier 50. On its backward movement the shuttle-carrier 50 engages two projecting fingers 58 on the under side of the sliding rods 55, which are thereby withdrawn from the open bottom of the magazine 52, thus allowing the next filled shuttle to fall onto the fingers 51 ready for the next insertion into the shuttle-box 26 when required.

As the shuttle-carrier 50 recedes and the fingers 51 are withdrawn from the shuttle-box 26, as above described, the arms and levers are returned to the positions shown in Fig. 4, and the front plate 27 is closed by the spring 29 by the continued revolution of the hollow cam 11, which allows the arm 20 to fall and the shaft 21 to rock back.

When the foregoing movements have been completed and a full shuttle has been inserted in the shuttle-box and the front closed, a bowl 59 on the inside of the spur-wheel 8 strikes against a neb or inclined projection 60 on a vertical lever 61, fulcrumed on the under framing at 62 and connected by a link 63 to another vertical lever 64, mounted loosely on the rock-shaft 46. At its upper end the lever 64 has a bowl 65, which when the lever is actuated by the connections from the neb 60 strikes an incline 66 on a lever 67, which is fulcrumed at 68 and passes at the other end into a slot in a bracket 69, bolted to the spring-handle 13. As the bowl 65 through the incline 66 presses the lever 67 outward the latter moves the spring-handle 13 out of the notch 16 in the weft-fork lever 17, and places it into a notch 70 in the "church" or ordinary notched plate 71, which notch 70 latches the spring-handle 13 in position while the loom is working. The movement which latches the spring-handle 13 in the notch 70 also by means of the connecting-rod 14 actuates the strap-fork lever 12 and shifts the driving-belt from the innermost pulley 5 to the fast pulley 3 which drives the loom.

To prevent the hollow cam 11 from overrunning or falling back out of its true relative position after the driving-belt has been taken off the pulley 5, I fulcrum at 72 on a bar 73, carried by the shafts 46 and 62 or otherwise, a vertical lever 74, connected by a spring 75 to the bar 73, and prevented from moving more than a certain distance toward the spring by a stud or catch 76. The upper end of this lever 74 is pressed outward by the projection 111 on the cam 11 against the resistance of the spring 75 until the projection 111 just clears the end of the lever 74 and is then by it prevented from moving back under the influence of the weight of the crank 40 and the heavy part of the cam.

To prevent the automatic shuttle-changing mechanism from coming into action when not required, I mount on the frame of the loom between the spring-handle 13 and the end of the loom-frame 1, but nearer the spring-handle, a double lever 77, (shown in Fig. 6,) fulcrumed at 78, which has the lower end shaped to meet the forward movement of the lower end of an elbow-lever 79, which is fixed on a shaft 80, carried in brackets 81, secured to the slay 82 of the loom. The other end of the elbow-lever 79 is held by its own weight or by a spring pressed against the ordinary swell or side spring 83 of the shuttle-box 26. The shaft 80, on which the lever 79 is fulcrumed, extends to the other end of the slay 28, and at the other end of this shaft from the one on which the lever 79 is fixed there is also fixed a lever similar to the upper portion of lever 79, and which also presses against the swell in the other shuttle-box at that end of the loom-slay. Therefore when the shuttle 36 enters the shuttle-box 26 at either end of the slay and remains there during the forward movement of the slay it presses out the swell 83, and tilting back the upper end of the lever 79 raises its lower end, thus causing it to pass over and miss striking the lower end of the double lever 77; but if there should be no shuttle in either shuttle-box at the time the slay moves forward to beat up the weft from any cause—such as the shuttle becoming trapped between the reed and fell of the cloth or because the shuttle has accidentally flown out of the loom when weaving or that during the absence of the weaver the loom may have automatically changed all the shuttles and exhausted the supply in the magazine—then the swell 83 is not pressed back and the elbow-lever 79 remains in the position shown in Fig. 6, and with the forward movement its lower end strikes the lower end of the lever 77, moving the upper end of the lever 77 forward into the path of the spring-handle 13. Now the shuttle not having entered the box, the weft will have failed to act upon the weft-fork 18 at the beat up of the loom-slay 82, thus causing the weft-fork 18 to engage with the weft-hammer 19, and, moving the weft-fork lever 17, which presses against the spring-handle 13, toward the front of the looms, pushes the spring-handle 13 out of the notch 70, thus releasing it. In the ordinary way of working, the spring-handle 13 upon being pushed out of the notch 70 by the weft-fork lever 17 flies or springs back into the notch 16 in the weft-fork lever 17 and, moving the strap-fork 12 from the outside or fast pulley 3 to the innermost pulley 5, starts the automatic shuttle-changing mechanism; but the lever 77 is fixed in such a position that when its upper end has been moved forward into the path of the spring-handle 13 it checks its movement in the exact position required for the strap-fork 12 to move from the outside past pulley 3 to the middle or loose pulley 4 and the loom is stopped.

The lever 77 is fulcrumed loosely at 78, and a V-shaped or other suitable spring 84 (see Fig. 9) is employed to lock the lever 77 and prevent it from moving too freely out of its vertical position.

It will readily be understood that the weaver can at any time by hand place and set the upper end of the lever 77 in the path of the spring-handle 13 so as to prevent the automatic shuttling motion from coming into action, the lock-spring 84 keeping the lever 77 in this position, and under these conditions the loom can be worked as an ordinary loom, the weaver starting the loom by hand and when stopped either by hand or by the weft-fork 18 the spring-handle 13 flying against the upper portion of lever 77.

From the foregoing description it will be obvious that when the spring-handle 13 is in the notch 70 in the church or notched plate 71 the strap-fork 12 is on the outside fast pulley 3 and the loom is weaving; but when the spring-handle 13 is in the notch 16 in the weft-fork 17 the strap-fork 12 is on the innermost pulley 5, the working parts of the loom being stopped while the automatic motion is in operation changing a shuttle. Again, when the spring-handle 13 is obstructed by the upper end of the lever 77 the strap-fork is only moved from the outside past pulley 3 to the middle loose pulley 4, and the automatic shuttle-changing motion is prevented from coming into action—that is to say, the ordinary parts are working and the loom weaving if the spring-handle 13 is latched in the notch 70, but are stopped and everything stands if the spring-handle is checked by and bearing against the upper end of the lever 77. Further, it should be stated that when the loom is weaving and the path of the spring-handle 13 which is in notch 70 is clear and unobstructed by the lever 77 the weaver can at any time stop the loom and all its motions by releasing the spring-handle 13 from the notch 70 and letting it fly back against the face of the projection 85 on the weft-fork lever 17. The face of this projection being exactly parallel with the upper end of the lever 77 when the lever is placed in the path of the spring-handle 13, the spring-handle is thus checked in the same position as by the lever 77 and the strap-fork brought to rest over the middle loose pulley 4 and the loom stopped.

On restarting the loom, to prevent any possibility of the automatic shuttling motion being brought into action by the weft-fork 18 engaging the weft-hammer 19 I fix to the spring-handle 13 a steel plate or flat spring-finger 86, which rests under the weft-fork 18 and between it and the hammer 19. This finger 86 is bent, as shown in Figs. 1 and 2, and near its free end has a raised portion or swell 87, which when the weaver pulls off the spring-handle 13 to stop the loom comes under and raises the weft-fork 18, so that it cannot at the moment of restarting engage the weft-hammer 19.

When the loom is weaving with the spring-handle 13 latched in the notch 70 and the weft breaks or fails, the weft-fork 18 falls and, engaging the weft-hammer 19, moves the weft-fork lever 17, thereby unlatching the spring-handle 13 from the notch 70 and allowing it to fly into the notch 16 in the weft-fork lever 17. This movement of the spring-handle causes, through the connecting-rod 14, the strap-fork 12 to shift the driving-belt from the fast pulley 3 to the innermost pulley 5, which then drives the large spur-wheel 8 and the hollow cam 11, and, actuating the rocking shafts 21 and 31, effects the opening of the front plate 27 of the shuttle-box 26 and the ejection of the spent-shuttle 36 through the open front. Then the movement of the spur-wheel 8 through the crank 40 rocks the shaft 46, inserts a fresh shuttle from the magazine 52 through the open front of the shuttle-box 26 by means of the fingers 51 on the shuttle-carrier 50, and when this has been done the shaft 46, rocking in the reverse direction, withdraws the fingers 51 from the shuttle-box, and the front plate 27 is closed by the spring 29, as the continued movement of the hollow cam 11 allows the shafts 21 and 31 to rock back. Simultaneously a fresh shuttle is dropped from the magazine 52 onto the fingers 51 ready for the next change, and the projecting bowl 59 on the spur-wheel 8, coming into contact with the neb 60, moves the connections and actuates the lever 67, thereby moving the spring-handle 13 back into the notch 70 and setting on the loom by shifting the driving-belt from the innermost pulley 5 back to the fast pulley 3.

What I claim as my invention, and desire to secure by Letters Patent of the United States, is, in the automatic shuttle-changing motion of a loom for weaving—

1. In combination, an arrangement of three pulleys on the crank-shaft, one a fast driving-pulley, the second a loose pulley and the third a loose driving-pulley combined with a pinion, a combined spur-wheel and hollow cam geared to the pinion of the loose driving-pulley, connections from the weft-fork which on the failure of weft, move the spring-handle, and connections from the spring-handle to the strap-fork for shifting the driving-belt onto the loose driving-pulley, a projection on the weft-fork lever forming an additional notch for latching the spring-handle and a projection on the weft-fork lever for latching the spring-handle, connections operated by the hollow cam when the driving-belt is on the loose driving-pulley for opening the front of the shuttle-box and ejecting the spent shuttle and closing the shuttle-box after the insertion of a fresh shuttle, connections operated by a crank on the axis of the hollow cam for inserting a fresh shuttle, and a projecting bowl on the cam spur-wheel for moving the spring-handle and setting on the loom, all substantially as herein set forth.

2. The improved motion for opening the front of the shuttle-box and ejecting the spent shuttle, consisting of the loose driving-pulley, its pinion, the large spur-wheel and the hollow cam combined therewith, the rocking shafts and their arms, the lever for opening the front plate of the shuttle-box, the bent lever for ejecting the shuttle through the open front and springs for closing the shuttle-box and returning the parts to their normal positions after a fresh shuttle has been inserted, all substantially as herein set forth.

3. The improved motion for inserting a fresh shuttle after the front of the shuttle-box has been opened and the spent shuttle ejected, consisting of a loose driving-pulley, its pinion, the large spur-wheel and the hollow cam combined, a shuttle carrier or pusher, a crank on the axis of the combined large spur-wheel and hollow cam, a spring-lever and rock-shaft, operatively connecting the carrier with the crank, the shuttle-carrier having fingers which take the bottom shuttle from the magazine and insert it into the shuttle-box the bottom of which is grooved to receive the fingers and allow the shuttle to rest on the box-bottom, all substantially as herein set forth.

4. The combination with the magazine 52 and the improved motion for inserting a fresh shuttle after the front of the shuttle-box has been opened and the spent shuttle ejected, consisting of a loose driving-pulley, its pinion, the large spur-wheel and the hollow cam combined, a shuttle carrier or pusher 50 fingers 51 thereon, a crank on the axis of the combined large spur-wheel and hollow cam, a spring-lever and rock-shaft, operatively connecting the crank with the carrier or pusher spring-rods 55 mounted to slide in the frame 54, follow up the carrier or pusher and temporarily support the shuttles in the magazine 52 while the fingers 51 are inserting a fresh shuttle into the open shuttle-box, all substantially as herein set forth.

In witness whereof I have hereunto set my my hand in presence of two witnesses.

JAMES MITCHELL GREY.

Witnesses:
S. W. GILLETT,
HERBERT R. ABBEY.